Patented Jan. 21, 1941

2,229,617

UNITED STATES PATENT OFFICE 2,229,617

CELLULOSE TRIACETATE COMPOSITIONS

Herbert L. Wampner, Terre Haute, Ind., assignor to Commercial Solvents Corporation, Terre Haute, Ind., a corporation of Maryland No Drawing. Application October 7, 1939, Serial No. 298,397

11 Claims. (Cl. 134—79)

My invention relates to cellulose acetate compositions, and particularly to such compositions comprising cellulose triacetate, nitromethane, and a lower saturated aliphatic alcohol.

Cellulose triacetate, which has a theoretical acetyl number of 44.8 is available commercially in grades having acetyl numbers in the neighborhood of 43—44. While a great many satisfactory and readily-available solvents have been suggested for nitrocellulose, relatively few solvents are available for cellulose acetate of low acetyl grades, and practically no satisfactory solvents are available for cellulose triacetates.

An object of my invention is to provide solvent components for cellulose triacetate compositions which have general application for at least partially dissolving cellulose triacetate. A further object of my invention is to provide cellulose triacetate solutions which are particularly suitable for the deposition of films or the extrusion of fibres, and for use as coating materials, airplane dopes, and the like. Other objects and advantages of my invention will be apparent from the following description.

Nitromethane has been proposed as a solvent for the ordinary coating grades of cellulose acetate, but this material is not a solvent for cellulose triacetates. However, I have now found that when mixed with a lower saturated aliphatic alcohol, nitromethane is capable of at least partially dissolving all of the various commercial grades of cellulose triacetate, and that mixtures of nitromethane, and the lower aliphatic alcohols constitute excellent solvents for grades of cellulose triacetate having acetyl numbers as high as 43.5.

I have also found that the addition of an aromatic hydrocarbon to the nitromethane-alcohol mixtures increases their solvent power for cellulose triacetate, and that the presence of aromatic hydrocarbons is especially advantageous in solvent mixtures for grades of cellulose triacetate having acetyl numbers of 43.5 or higher. Any of the usual aromatic hydrocarbon diluents commonly employed in coating compositions may be used for this purpose, as, for example, benzol, toluol, and xylol. I prefer, however, to employ toluol for most purposes.

The alcohols which are suitable for use in my compositions comprise the lower saturated aliphatic monohydric alcohols, especially those containing from 1 to 4 carbon atoms. Among these, methanol forms the most active solvent mixtures, and I have found that the solvent power of the nitromethane-alcohol mixtures decreases with increasing molecular weight of the alcohol. Since the solubility of cellulose triacetate decreases with increasing acetyl number, it is therefore advisable to employ a low molecular weight alcohol in a solvent mixture for a high acetyl grade of cellulose triacetate, whereas for a lower acetyl grade of cellulose triacetate, higher molecular weight alcohols may be employed. These relationships are set forth in the following table, representing the solubility of three different grades of cellulose triacetate in nitromethane-alcohol mixtures, and in nitromethane-alcohol-toluol mixtures. In each case the cellulose triacetate and solvents were employed in a ratio of 10 g. of cellulose triacetate per 100 ml. of solvent mixture.

| Composition of solvent mixture | Alcohol | Temp., °F. | Solubility of cellulose triacetate | | |
|---|---|---|---|---|---|
| | | | Acetyl No. 43.2 | Acetyl No. 43.5 | Acetyl No. 44.0 |
| 70% nitro-methane 30% alcohol | Methyl | 75 | Clear solution | Clear solution | Trace grainy. |
| | Ethyl | 75 | do | do | Do. |
| | i-Propyl | 75 | do | do | Do. |
| | n-Propyl | 75 | do | do | Do. |
| | 2-Butyl | 75 | do | do | Cloudy and grainy |
| | t-Butyl | 75 | do | do | Do. |
| | i-Butyl | 75 | do | do | Do. |
| | n-Butyl | 75 | do | Cloudy and grainy | Cloudy and gelled. |
| | Amyls* | 75 | do | Quite cloudy | Insoluble. |
| 70% nitromethane 15% toluol 15% alcohol | Methyl | 75 | Clear solution | Clear solution | Clear solution. |
| | Ethyl | 75 | do | do | Trace grainy. |
| | i-Propyl | 75 | do | do | Trace cloudy. |
| | n-Propyl | 75 | do | do | Do. |
| | s-Butyl | 75 | do | do | Slightly cloudy. |
| | t-Butyl | 75 | do | do | Cloudy and grainy. |
| | i-Butyl | 75 | do | do | Do. |
| | n-Butyl | 75 | do | do | Do. |
| | Amyls* | 75 | do | Slightly cloudy | Insoluble. |
| 70% nitromethane 30% alcohol | Methyl | 85 | Clear solution | Clear solution | Clear solution. |
| | Ethyl | 85 | do | do | Do. |
| | i-Propyl | 85 | do | do | Do. |
| | n-Propyl | 85 | do | do | Do. |
| | s-Butyl | 85 | do | do | Do. |
| | t-Butyl | 85 | do | do | Do. |
| | i-Butyl | 85 | do | do | Do. |
| | n-Butyl | 85 | do | do | Do. |
| | Amyls* | 85 | do | do | Slightly cloudy. |

*Mixed amyl alcohols derived from pentane fraction of gasoline.

| Composition of solvent mixture | Alcohol | Temp., °F. | Solubility of cellulose triacetate | | |
|---|---|---|---|---|---|
| | | | Acetyl No. 43.2 | Acetyl No. 43.5 | Acetyl No. 44.0 |
| 70% nitromethane 15% toluol 15% alcohol | Methyl | 85 | Clear solution | Clear solution | Clear solution. |
| | Ethyl | 85 | ...do... | ...do... | Do. |
| | i-Propyl | 85 | ...do... | ...do... | Do. |
| | n-Propyl | 85 | ...do... | ...do... | Do. |
| | s-Butyl | 85 | ...do... | ...do... | Do. |
| | t-Butyl | 85 | ...do... | ...do... | Do. |
| | i-Butyl | 85 | ...do... | ...do... | Do. |
| | n-Butyl | 85 | ...do... | ...do... | Do. |
| | Amyls* | 85 | ...do... | ...do... | Slightly cloudy. |

*Mixed amyl alcohols derived from pentane fraction of gasoline.

It may be seen from the above table that the solvent power of the nithromethane compositions has a pronounced temperature coefficient, and that cellulose triacetate which is in solution at one temperature, may be thrown out of solution by substantial cooling of the composition. For this reason, if it is desired to deposit cellulose triacetate in a clear form, it is necessary to prevent undue cooling during evaporation of the solvent. This may be readily accomplished by various means, for example by controlling the degree of saturation of the atmosphere by solvent vapors when extruding fibers, or producing films or sheets of cellulose triacetate. It will, of course, also be necessary to employ the other precautions, well known in the art, for preventing precipitation of the solids during evaporation of the solvent components. Thus, it is necessary to properly correlate the proportions of the solvent components and their respective evaporation rates, so that the composition of the liquid mixture will not change sufficiently during evaporation to lose its solvent power. The proportions of alcohol, or of alcohol and aromatic hydrocarbon, to be employed in the solvent mixture, will depend upon the particular alcohol and hydrocarbon chosen, the acetyl value of the cellulose triacetate, and the temperature at which the material is to be handled. Representative formulations are shown in the table above, and in the following examples, and the optimum proportions in any case can be determined by preliminary tests.

My invention may be further illustrated by the following specific examples:

Example I

Cellulose triacetate of acetyl number 43.2 was dissolved in a solvent mixture comprising, by volume, 50% nitromethane, 25% ethyl alcohol, and 25% toluol. The materials were employed in a ratio of 90 g. of cellulose triacetate per liter of solvent mixture. A clear solution was obtained, which was flowed on a glass surface maintained at 85° F., to deposit a clear film of cellulose triacetate.

Example II

Cellulose triacetate of acetyl number 43.5 was dissolved in a solvent mixture comprising, by volume, 50% nitromethane, 20% normal propyl alcohol, and 30% toluol. The materials were employed in a ratio of 90 g. of cellulose triacetate per liter of solvent mixture. A clear solution was obtained, which was flowed on a glass surface maintained at 85° F., to deposit a clear film of cellulose triacetate.

It is to be understood, of course, that the above examples are merely illustrative of solutions of cellulose triacetate prepared in accordance with my invention, but that these examples in no way limit the scope of my invention. Although my solvent compositions are especially adapted for use with grades of cellulose triacetate of acetyl numbers from approximately 43 to approximately 44, they may be employed with any of the commercial grades of cellulose triacetate. One skilled in the art may readily modify the above examples by substituting other solvent components in accordance with the foregoing disclosure, or by the addition of other solvents or of compatible modifying agents of the type commonly employed in the production of compositions to be used as coating materials, for the production of films or fibers, or for other known uses in this art. It is to be understood, therefore, that the use of any equivalents or modifications which would naturally occur to one skilled in the art, is included within the scope of my invention.

This application is a continuation-in-part of application Serial No. 159,110, filed August 14, 1937.

My invention now having been described, what I claim is:

1. A process for dissolving cellulose triacetate to produce a clear solution, which comprises contacting said cellulose triacetate with a mixture of nitromethane and a lower saturated monohydric aliphatic alcohol.

2. A process for dissolving cellulose triacetate to produce a clear solution, which comprises contacting said cellulose triacetate with a mixture of nitromethane, a lower saturated monohydric aliphatic alcohol, and an aromatic hydrocarbon.

3. A process for dissolving cellulose triacetate of acetyl number from approximately 43 to approximately 44 to produce a clear solution, which comprises contacting said cellulose triacetate with a mixture of nithromethane and a saturated monohydric aliphatic alcohol having from 1 to 4 carbon atoms.

4. A process for dissolving cellulose triacetate of acetyl number from approximately 43 to approximately 44 to produce a clear solution, which comprises contacting said cellulose triacetate with a mixture of nitromethane, a saturated monohydric aliphatic alcohol having from 1 to 4 carbon atoms, and toluol.

5. A composition of matter comprising cellulose triacetate, nitromethane, and a lower saturated monohydric aliphatic alcohol, the components of the solvent mixture being in such proportion as to completely dissolve the cellulose triacetate.

6. A composition of matter comprising cellulose triacetate, nitromethane, a lower saturated monohydric aliphatic alcohol, and an aromatic hydrocarbon, the componets of the solvent mixture being in such proportion as to completely dissolve the cellulose triacetate.

7. A composition of matter comprising cellulose triacetate of acetyl number from approximately 43 to approximately 44, nitromethane, and a saturated monohydric aliphatic alcohol having from 1 to 4 carbon atoms, the components of the solvent mixture being in such proportion as to completely dissolve the cellulose triacetate.

8. A composition of matter comprising cellulose triacetate of acetyl number from approximately 43 to approximately 44, nitromethane, a saturated monohydric aliphatic alcohol having from 1 to 4 carbon atoms, and toluol, the components of the solvent mixture being in such proportion as to completely dissolve the cellulose triacetate.

9. A composition of matter comprising cellulose triacetate of acetyl number from approximately 43 to approximately 44, nitromethane, methyl alcohol, and toluol, the components of the solvent mixture being in such proportion as to completely dissolve the cellulose triacetate.

10. A composition of matter comprising cellulose triacetate of acetyl number from approximately 43 to approximately 44, nitromethane, ethyl alcohol, and toluol, the components of the solvent mixture being in such proportion as to completely dissolve the cellulose triacetate.

11. A composition of matter comprising cellulose triacetate of acetyl number from approximately 43 to approximately 44, nitromethane, a propyl alcohol, and toluol, the components of the solvent mixture being in such proportion as to completely dissolve the cellulose triacetate.

HERBERT L. WAMPNER.